UNITED STATES PATENT OFFICE.

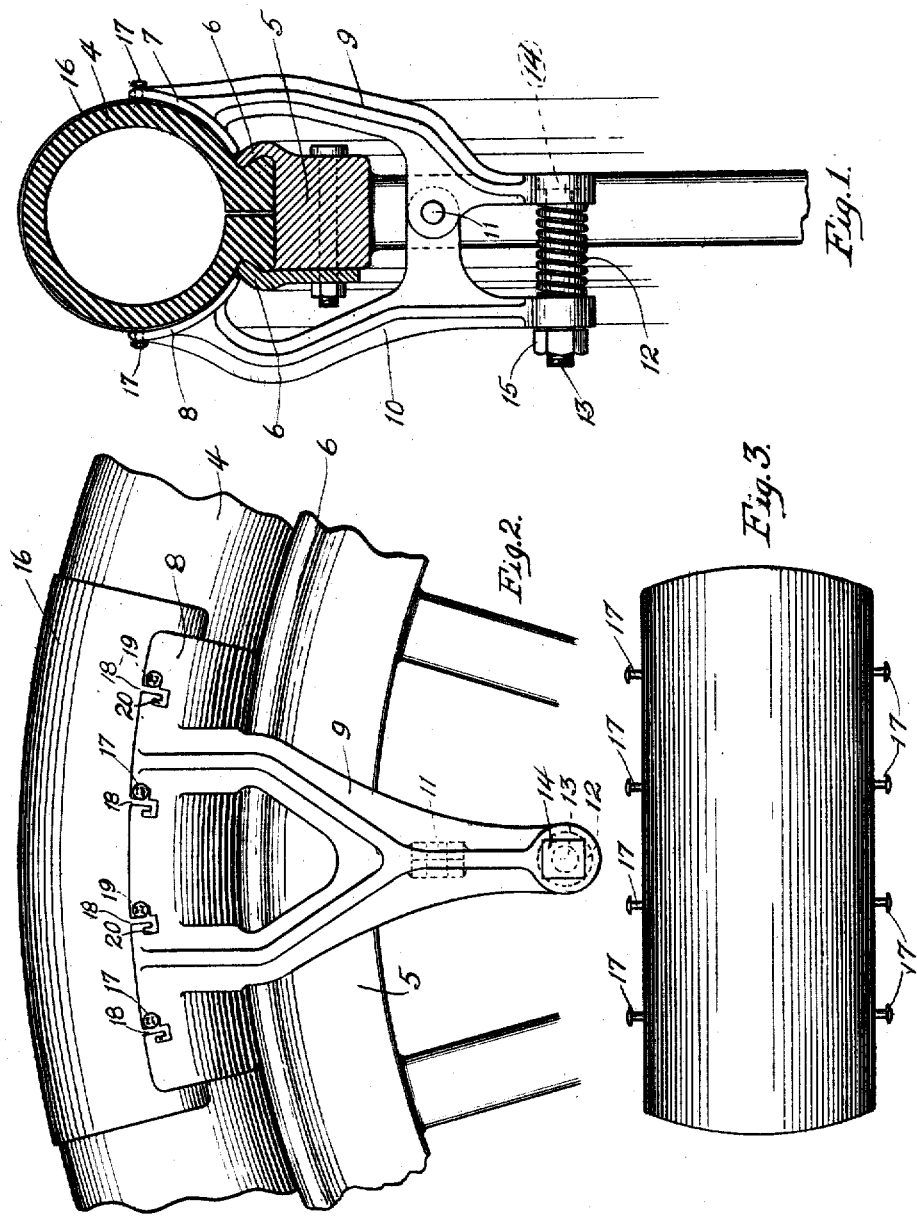

JOSEPH C. HAMMER, OF CHICAGO, ILLINOIS.

TIRE-PROTECTOR.

1,012,353.  Specification of Letters Patent.  Patented Dec. 19, 1911.

Application filed November 7, 1910. Serial No. 591,053.

*To all whom it may concern:*

Be it known that I, JOSEPH C. HAMMER, a citizen of the United States, residing at Chicago, in the county of Cook and State of Illinois, have invented certain new and useful Improvements in Tire-Protectors, of which the following is a specification.

This invention relates to protectors for pneumatic tires and is designed particularly to protect such tires against blow-outs at their weakest points.

My invention has for its objects to provide a clamp and boot of such type as may be applied to the tire without the necessity of deflating it; to provide a clamp that will afford a support to the tire close to its supporting flanges; and to provide a tension controlled clamp for holding the protector in proper position upon the tire.

The invention further consists in the features of construction and combination of parts hereinafter described.

In the drawings, Figure 1, is a cross section through a tire showing in elevation the clamp and protector attached; Fig. 2, a side elevation of Fig. 1; Fig. 3, a plan view of the boot designed to be used in combination with the clamp.

A tire 4 is shown mounted on a felly 5 and supported between flanges 6. Said tire is gripped on either side by jaws 7 and 8 mounted on arms 9 and 10 respectively, which arms are pivoted at a common point 11. A compression spring 12 is interposed between said arms at one end in such a manner that the jaws are forced inward against the tire. A bolt 13 lies within said spring having one end 14 countersunk in the arm 9 and the other end threaded to receive thereon a nut 15. A boot 16 of leather or other material surrounds the tire and has its longitudinal ends clamped within the jaws 7 and 8. Said boot is provided with headed pins 17 adapted to engage in slots 18 formed along the upper surface of the jaws. As shown in Fig. 2 the slots are formed with oppositely extending bayonet slots 19 and 20, the position of the slot 19 being somewhat above that of 20. This construction will permit of the boot being readjusted from time to time upon the tire, inasmuch as the pins 17 can be made to engage in any of the slots as desired.

My device is designed to be used in connection with wheels having thereon pneumatic tires. Where the outer casing of such tires becomes weakened at some known point it is liable to blow out. It is to strengthen such a weakened place on the tire that my protector is designed. In applying the protector on the tire the nut 15 may be screwed up on the bolt 13 to overcome the strong pressure exerted by the spring, thereby causing the jaws to open. This may be done either when the tire is inflated or deflated. The boot 16 is then placed around the tire at the point where its support is needed and the pins 17 are positioned in the slots 18. The boot when first used will probably fit snugly upon the tire and the pins will accordingly engage in the bayonet slots 19. It is of course evident that the boot will stretch and tend to loosen upon the tire. The boot can then be adjusted with respect to the clamp by having the pins engage the openings 20 of the bayonet slots. Obviously the boot can be adjusted from time to time upon the tire by having the pins engage with different bayonet slots.

The use of a boot encircling the outside of the tire, whose ends are laced on the inside of the felly is quite common. Certain difficulties arise with this type of protector. In the first place, that portion of the tire adjacent the supporting flanges receives no support from the boot and in the second place, there is considerable boot material liable to stretch, thereby making constant readjustment of said boot necessary. These objections I have overcome with the use of my protector. The clamp, it will be noticed, engages the tire on both sides close to the supporting flanges. This portion of the tire frequently receives the severest strain. Furthermore, the means I employ, to hold the boot in place, namely, the engagement of its pins in the slotted clamp, results in less material being necessary for the boot, and less opportunity for the boot to stretch or loosen upon the tire.

Another feature of my construction is that the tight clamping of the jaw upon the side of the tire will effectually prevent any slipping or travel of the boot along the tire. Where a boot is held in place only by lacing its longitudinal ends on the inside of the felly, a certain amount of travel upon the tire will always occur, and it is very likely that the boot will then have slipped off the weak point on the tire that it was designed to protect.

The interposition of a spring between the ends of the arm provides for a certain amount of resiliency between the jaws acting upon the tire. That portion of the tire which bears upon the pavement is necessarily compressed. Where this compression is on that portion of the tire where a blow-out has occurred, it is obvious that at that point the tire is subjected to unusual strain. By providing jaws that bear up stiffly against the side of the tire capable of being sprung outwardly against the strong tension of the spring, the tire can give and compress sufficiently to maintain the resiliency safely. It is very likely that a weak place on the tire may be close to the supporting flanges. In such a case if the tire is not seriously impaired, my clamp may be used independently of the boot.

I claim:

A tire protector comprising companion arms, said arms swinging around a common pivotal center, a shield-like member on the outer end of each of said arms oppositely disposed to one another and clamping the tire on opposite sides thereof, said arms being free with respect to the wheel body, whereby the shield-like members may be adjusted to the desired position upon the tire body, tension mechanism for holding the shield-like members in engagement with the tire body comprising a tension member located at one side of said pivotal center and exerting force tending to throw the shield-like members into engaging position with the tire, a boot positioned on said tire, and means for locking said boot to said shield-like members, substantially as described.

JOSEPH C. HAMMER.

Witnesses:
EPHRAIM BANNING.
ROSE LEVITSKY.